F. D. POUCH.
CHANGE SPEED GEARING.
APPLICATION FILED JAN. 28, 1909.
941,727.
Patented Nov. 30, 1909.
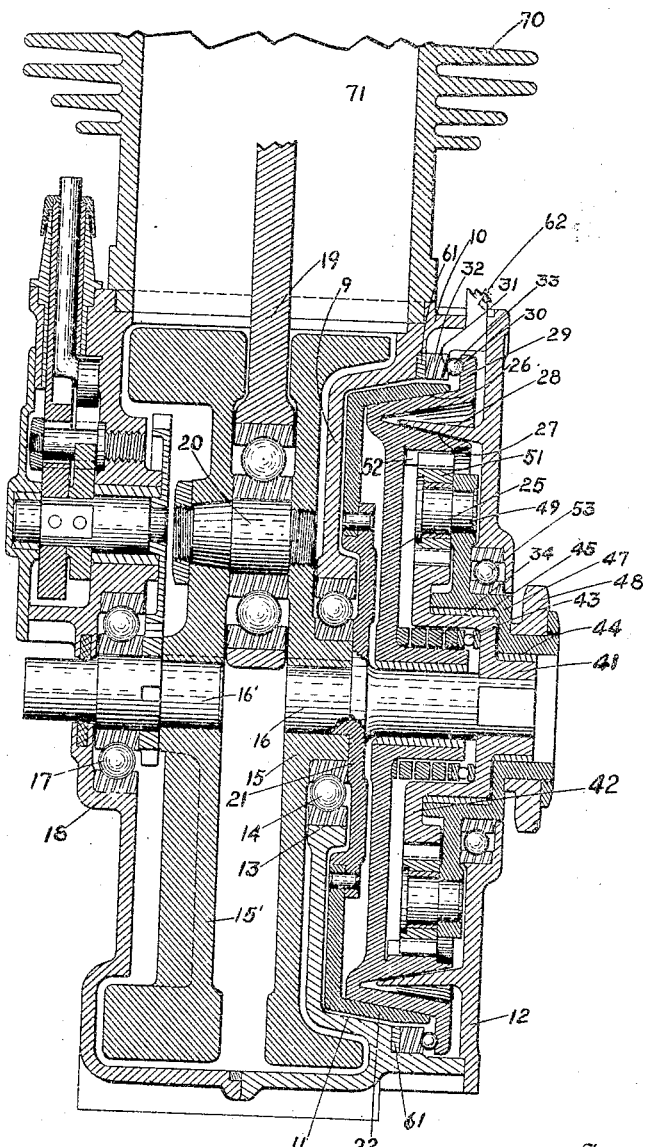
Witnesses
Walter Troemel.
Thomas W. McMeans
Inventor
Frank D. Pouch.
By Bradford Hood.
Attorney

UNITED STATES PATENT OFFICE.

FRANK D. POUCH, OF NEWCASTLE, INDIANA.

CHANGE-SPEED GEARING.

941,727.

Specification of Letters Patent. Patented Nov. 30, 1909.

Application filed January 28, 1909. Serial No. 474,658.

*To all whom it may concern:*

Be it known that I, FRANK D. POUCH, a citizen of the United States, residing at Newcastle, in the county of Henry and State of Indiana, have invented certain new and useful Improvements in Change-Speed Gearing, of which the following is a specification.

The object of my invention is to produce a speed changing gearing embodied compactly within the casing of an engine, the structure being especially designed for use in conjunction with small engines, such as are commonly used in motorcycles, but not being confined to such use.

The accompanying drawing which is an axial section, illustrates my invention.

In the drawing, 10 indicates a crank-casing or engine-base in one side of which is formed a pocket 11 concentric with the axis of the crank shaft, the outer end of said pocket being closed by a cover ring 12. The bottom 9 of pocket 11 is provided with a central bore 13 within which is arranged a ball-bearing 14 of any convenient type, as shown, and said bearing 14 carries the hub of a fly-wheel-disk 15 keyed upon shaft 16. Arranged in alinement with shaft 16 is a shaft 16′ which carries a fly wheel disk 15′, and shaft 16′ is supported by a ball-bearing 17 supported in turn in a suitable cup 18 formed in that wall of the crank base stem opposite the bottom 9 of pocket 11. The two fly-wheel disks 15 and 15′ are separated a distance suitable to permit the insertion of a pitman 19 which is suitably journaled upon a wrist pin 20 connecting the two fly-wheel disks. Secured to, or formed integrally with, shaft section 16, closely adjacent the bottom 9 of pocket 11, is a flange or spider 21 which carries a friction flange or cup 22 which is slightly outwardly flared. Nested within flange 22 is a friction drum 25 provided with an inwardly coned friction surface 26, which is adapted to engage flange 22, and also provided with an outwardly coned recessed friction surface 27 adapted to engage a correspondingly-flared friction annulus 28, carried by the cover ring 12, and nested within the drum 25. Drum 25 is provided at its outer edge with a flange 29 in which is formed an annular ball race 30, coöperating with a ball race 31 carried by a cam ring 32, bearing balls 33 being arranged in the two races 30 and 31. Balls 33 are held in place by means of a spring 34 which surrounds the hub of friction drum 25 and normally urges said drum to the left and into engagement with flange 22. The hub of drum 25 is journaled upon shaft 16. Keyed to the outer end of shaft 16 is the hub 41 of a gear 42. Spring 34 is nested within gear 42 and a thrust bearing 43 is arranged between the outer end of said spring and the gear 42. Gear 42 is stepped at 44 and 45, in order to compactly arrange it with relation to the other parts, and each of these steps is provided with bearing portions so that a disk 47 may be journaled thereon, the outer end projecting through and beyond the cover ring 12 and carrying the driving sprocket 48. Disk 47 carries a plurality of studs 49 on each of which is journaled a planetary pinion 51, said pinions meshing with gear 42 and also meshing with internal gear teeth 52 carried by drum 25. A bearing 53 is arranged between disk 47 and cover 12. Ring 32 is provided upon its rear surface with cams 61 which coöperate with similarly formed portions of the casing 10 so that, by a partial rotation of ring 32, by means of a suitable operating member 62, drum 25 may be shifted to the right, first out of frictional engagement with flange 22, and then into engagement (its portion 27) with the stationary friction flange 28.

The operation is as follows: With the parts in the position shown in the drawing, drum 25 is in tight frictional engagement (through surface 26) with flange 22 and therefore, as gear 42 is firmly attached to shaft 16 and gear 42 and drum 25 are connected by means of the planetary pinions 51 which, at this time serve as clutches, sprocket 48 will be driven forwardly at the speed of shaft 16. If a lower speed is desired ring 32 is shifted and drum 25 will first be thrown out of engagement with ring 22 so that, if the parts are maintained in this position, there will be no driving action upon the sprocket 48. If, however, ring 32 is carried to its other extreme, surface 27 of drum 25 will be forced into frictional engagement with ring 28 which is stationary. Drum 25 will therefore be held stationary and the driving force will be transmitted through gear 42 to pinions 51, which will be thereupon rolled upon the stationary internal gear 52, and disk 47 with its sprocket 48 will consequently be driven forward at a reduced speed.

The fly wheel disk 15, while having a comparatively heavy rim, is dished at its center so that the pocket-forming wall 9 is nested within the adjacent fly wheel disk.

It will be seen, therefore, that the entire speed-changing mechanism is nested within the casing of the crank shaft within the overall dimension of the usual radiating ribs 70 of the engine cylinder 71.

I claim as my invention:

1. The combination of a shaft, a friction member carried thereby, a friction drum journaled upon said shaft and provided with two friction surfaces one adapted to coöperate with the said friction member and the other adapted to coöperate with a fixed friction member, said fixed friction member, a spring for normally urging said friction drum in one direction, means for shifting said friction drum in opposition to its spring, a series of gear teeth carried by said friction drum, a gear carried by the shaft, a driven member, and a planetary gear carried by said driven member and connecting the shaft gear and the friction-drum gear teeth.

2. The combination of a shaft, a friction member carried thereby, a friction drum journaled upon said shaft and provided with two friction surfaces one adapted to coöperate with the said friction member and the other adapted to coöperate with a fixed friction member, the said fixed friction member, means for shifting said friction drum, a series of gear teeth carried by said friction drum, a gear carried by the shaft, a driven member, and a planetary gear carried by said driven member and connecting the shaft gear and the friction-drum gear teeth.

3. The combination of a shaft, a cup-shaped friction member carried by said shaft, a friction drum nested within said cup-shaped friction member and journaled upon the shaft, a stationary friction member nested within the friction drum, said friction drum having a recessed friction surface to coöperate with said stationary friction member, means for axially shifting the friction drum, a gear carried by the shaft and nested within the friction drum, a series of internal gear teeth formed within the friction drum, planetary gears connecting said last mentioned gear teeth and the shaft gear, and a driven gear journaled concentric with the shaft and carrying said planetary pinions, substantially as and for the purpose set forth.

4. The combination of a shaft, an inclosing casing having a pocket recess within which said shaft is journaled, a cup-shaped friction member carried by said shaft and nested within the pocket of the casing, a friction drum nested within said friction member and journaled upon the shaft, a cover member for the pocket of the casing, a stationary friction member carried by said cover member and nested within the friction drum, said drum having a recessed friction surface to coöperate with said stationary friction member, means for axially shifting the friction drum, a gear carried by the shaft and nested within the friction drum, a series of internal gear teeth formed within the friction drum, planetary gears connecting said last mentioned gear teeth and the shaft gear, and a driven gear journaled concentric with the shaft and carrying said planetary pinions, and a bearing member arranged between said driven gear and the cover member, substantially as and for the purpose set forth.

5. The combination of a shaft, an inclosing casing having a pocket recess within which said shaft is journaled, a cup-shaped friction member carried by said shaft and nested within the pocket of the casing, a friction drum nested within said cup-shaped friction member and journaled upon the shaft, a cover member for the pocket of the casing, a stationary friction member carried by said cover member and nested within the friction drum, said friction drum having a recessed friction surface to coöperate with said stationary friction member, a spring normally urging the friction drum in one direction, means for axially shifting the friction drum against the action of said spring, a gear carried by the shaft and nested within the friction drum, a series of internal gear teeth formed within the friction drum, planetary gears connecting said last mentioned gear teeth and the shaft gear, and a driven gear journaled concentric with the shaft and carrying said planetary pinions, and a bearing member arranged between said driven gear and the cover member, substantially as and for the purpose set forth.

In witness whereof, I have hereunto set my hand and seal at Newcastle, Indiana, this twenty-third day of January, A. D. one thousand nine hundred and nine.

FRANK D. POUCH. [L. S.]

Witnesses:
STANLEY BAKER,
FRED THOMAS.